Figure 1:
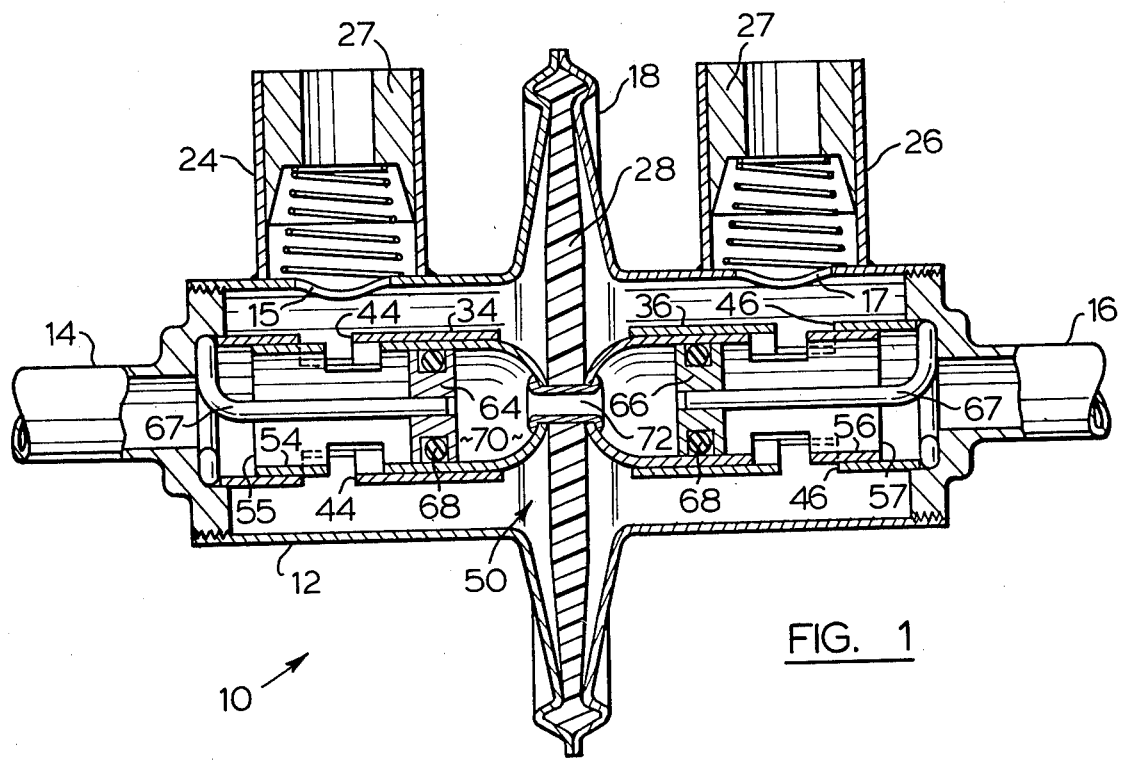

United States Patent [19]

Petursson

[11] 4,094,333
[45] June 13, 1978

[54] REGULATING VALVE SYSTEM

[76] Inventor: Sigurdur G. Petursson, 2169 Linby Street, Mississauga, Ontario, Canada, L4Y 1V6

[21] Appl. No.: 676,980

[22] Filed: Apr. 14, 1976

[51] Int. Cl.² ............................................. G05D 11/02
[52] U.S. Cl. ..................................... 137/100; 137/508
[58] Field of Search ................... 137/98, 100, 101, 508

[56] References Cited

U.S. PATENT DOCUMENTS

| 962,111 | 6/1910 | Assmann | 137/98 |
|---|---|---|---|
| 2,645,240 | 7/1953 | Drake | 137/100 |
| 2,874,715 | 2/1959 | Richards | 137/98 |
| 3,054,420 | 9/1962 | Williams | 137/508 |
| 3,688,790 | 9/1972 | Esten | 137/98 |
| 3,724,480 | 4/1973 | Povalski et al. | 137/98 |
| 3,727,627 | 4/1973 | Bird et al. | 137/100 |
| 3,788,311 | 1/1974 | Fahlman et al. | 137/98 |
| 3,799,496 | 3/1974 | Esten | 137/100 |

FOREIGN PATENT DOCUMENTS 991,639   10/1951   France .................................... 137/98

Primary Examiner—William R. Cline
Assistant Examiner—H. Jay Spiegel

[57] ABSTRACT

A pressure regulating valve is provided having a balance diaphragm for positioning a slide valve in flow controlling relation to maintain a fluid outlet in pressure balanced relation despite pressure variations at the inlet. The valve arrangement includes in combination with the inlet a pre-sensing chamber to apply a biassing force component on the valve member in a closing direction, responsive to inlet pressure. In a further embodiment utilizing a pair of such valves in opposed mutually balancing relation as a pressure balancing valve, in addition to modifying the characteristic valve response time, the arrangement has the particular benefit of being able to virtually close off the flow from one of the two sources of line pressure in the event that pressure at the respective other inlet falls to an ineffective value. While useful with many fluids, particular utility is found in mixing hot and cold liquids.

7 Claims, 2 Drawing Figures

U.S. Patent   June 13, 1978   4,094,333

REGULATING VALVE SYSTEM

This invention is directed to a pressure regulating valve of particular utility for controlling and maintaining constant pressure of a fluid or fluids.

The art of pressure regulation, including pressure balancing is highly developed and many valves exist for the purpose of providing pressure stabilization, usually by equalization, as a prerequisite to subsequent mixing or blending of gasses or liquids. Certain shortcomings in many of these prior arrangements have been a tendency to clog up in service, due to reliance upon sized pressure communicating orifices, and more importantly in many, an inability to effectively close-off fluid through-flow when one or other of the inlet supplies becomes blocked or completely fails.

Characteristic of the prior art is U.S. Pat. No. 2,145,114 Gibbs et al, Jan. 24th, 1939, wherein a balancing diaphragm regulates a pair of coupled side valves in response to the respective outlet pressures of the two fluids being balanced. Gibbs et al rely upon comparatively small orifices located at the inner ends of the slide valves to communicate the respective outlet pressures to the opposed chambers of the balance diaphragm. The operation of the slide valves is conditioned solely by variations in outlet pressures, and in the event that one or other of the sides of the valve communication orifices become solidly or substantially blocked this would provide a hydraulic lock precluding shut-off in the event of fluid supply failure at one or other of the inlets.

In accordance with one embodiment of the present invention there is provided a pressure balancing valve to give a balance between two fluid outlet pressures despite variations in pressure at the respective fluid inlets, having a balancing valve mechanism supported in pressure equalizing relation by a diaphragm dividing a portion of the valve body into opposed pressure balancing chambers each connected in pressure receiving relation with a respective fluid outlet, including a pair of pre-sensing chambers respectively connected to the fluid inlets, each chamber having a portion of the respective valve mechanism sealingly located therein in inlet-pressure responsive relation to provide a balancing force component responsive to inlet fluid pressure in supplemental relation to forces provided by the diaphragm.

The present invention makes possible both regulating and balancing valve arrangements having the advantages of sensing line pressure fluctuations to act in a compensatory regulatory sense before the incoming fluid passes through the throttling aperture of the valve. This provides both a stable and rapidly responsive valve with a minimum of pulsation or oscillation at the outlet, the position of the throttling valve being governed in response to both inlet and outlet pressures.

The structure by means of which the present invention is practiced is characterised by an absence of small communication passages or orifices other than the main throttling passages of the valve, and the inlet pressure sensing surfaces are located in the main line of inlet flows, so as to ensure a direct action of inlet pressure on the sensing surfaces with minimum adverse effects due to scale or other deposits.

The presently described apparatus includes a pair of opposed cylinder tube slide valves each having only a portion of the cross-section thereof exposed to ambient inlet pressure.

A further valve embodying the present invention comprises substantially one half of the balancing valve arrangement, wherein the force balancing function provided by one valve portion operating within an inlet chamber has substituted therefore force applying means such as a mechanical or fluid spring of a type selected for the desired duty. This embodiment is suited for use as a pressure regulating valve, to maintain a pre-selected output pressure substantially unchanged despite variations of inlet pressure over a significant range.

Figure 2:
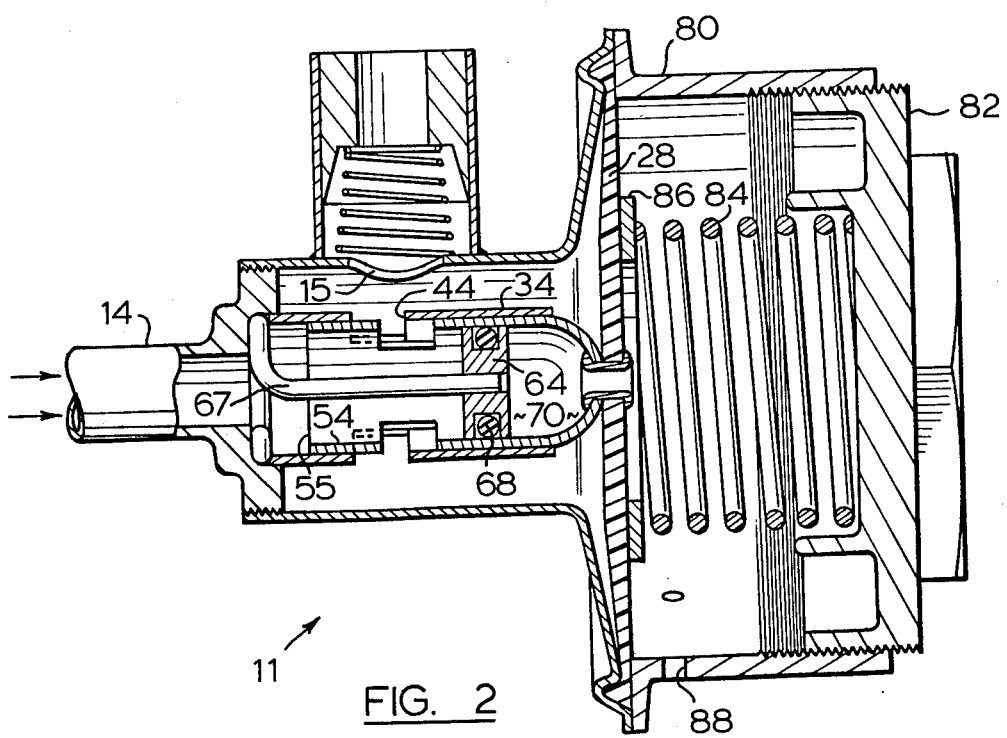

Certain embodiments of the invention are described, reference being made to the accompanying drawings wherein:

FIG. 1. comprises a diagramatic cross-section of a subject pressure balancing valve, and FIG. 2. is a like view of a pressure regulating valve.

Referring to the illustrated FIG. 1 embodiment of a pressure balancing valve, the valve 10 comprises a body portion 12 having a pair of opposed inlets 14, 16 and adjoining respective outlets 24, 26.

The valve body 12, which is of generally tubular form is bisected by a large diameter housing portion 18 in which an elastic diaphragm 28 is secured internally of the valve, dividing it into two fluid separated halves.

A pair of cylindrical valve housings, 34, 36 extend inwardly from the respective inlets 14, 16 being secured in sealing relation therewith. The housings 34, 36 have respective recesses 44, 46 providing fluid flow outlet ports between the inlets 14, 16 and the respective outlets 24, 26. Outlet ports 15, 17 extend through the upper portion of valve 12.

The outlets 24, 26 are shown having outlet throttles 27 which could be varied with orifices.

A slide valve means 50 carried by the diaphragm 28 has a first cylindrical valve member 54 slidably mounted in substantial sealing relation within housing 34, and a second cylindrical valve member 56 similarly mounted within housing 36, being appropriately ported, as illustrated, in cooperation with the recesses, 44, 46 to provide a full range of flow control in accordance with the axial position of the diaphragm 28, between shut-off and full flow.

A pair of stationary piston means 64, 66 mounted on rods 67 secured to the valve housing, and having respective O-ring seals 68 are located within the slide valves 54, 56 in sealing relation therewith, to define a so-called "constant volume" 70 which includes complementary isolated zones within each slide valve 54, 56 and a communicating aperture 72 therebetween.

Considering the function of the valve, the left hand portion of the valve represents one flow path in balance with the flow path of the right hand portion.

Fluid flowing into the left hand inlet exerts both a dynamic and a static pressure force against the axially outer valve end face 55 for which there is no balancing area present in the valve 54. This is also the case for the end face 57 of the right hand valve portion. It will be evident that these two forces are in mutual opposition. It is the presence of the fixed piston 64 mounted on its' rod 67 which limits the applied pressure force to acting only against the periphery or outer rim area 55, and area 57 respectively.

In the event that pressure liquid should fill the interior spaces 70, 72 by leakage past O-ring seals 68 any pressure therein will be equalized throughout this space, and as there is no effective throttling in the passage 72, and as the total trapped volume 70 and 72 remains constant, there is no normal possibility of the generation of unbalanced force internally of the valve, other than that acting on inlet faces 55 and 57. Thus, in the usual instance where the supply or line pressures at respective inlets 14, 16 are unequal, and flow quantities also may vary significantly with consequent inlet velocity imbalance, there is an initial out-of-balance force biassing the valve means in a direction to open up the internal flow path of the low pressure side, and to further restrict the internal flow path of the higher pressure side. Thus there is a pre-sensing action as the valve is subject and initially reacts to inlet pressure and velocity head.

Upon passage of fluid through the throttles 44, 46 and the cooperating ports of members 54, 56 which produce pressure drops related to the position of the valve means leftwardly or rightwardly off-centre, a reduced outlet pressure is present in each of the two valve outer balancing chambers, and acting on opposite sides of the diaphragm 28 so as to further position the valve means in pressure balancing relation.

It will be seen that in the event the inlet pressure one one side or the other of the valve should fall such that flow is critically terminated, the imbalance of force sensed in the pre-sensing chambers is usually sufficient to close off the opposed inlet.

Thus, in the case of a water mixing system, where either the hot or the cold water supply failed, there would be an immediate reaction to shut off the remaining supply, so that no severely unbalanced flow condition could arise at the outlets. The device thus can serve as an anti-scald device.

It will further be observed that the principles of the present invention are not dependent upon physical symetry of the arrangement, so that a large range of variation in service can be incorporated into individual arrangements.

Turning to the FIG. 2 embodiment which is that of a pressure regulating valve 11, there is provided a housing 80 having an axially adjustable cap 82 threadedly secured thereto, in compressing relation with a spring 84. A ring 86 bonded to the diaphragm 28 distributes the force of spring 84 thereagainst. A drain hole 88 or a series of apertures maintains the volume 70 unpressurized in the event of any leakage past the sealing O-ring 68, when a mechanical spring is utilised.

By selectively positioning the cap 82, a desired degree of pre-compression is given to the spring 84. Alternatively, a fluid pressure force or its equivalent may be substituted appropriately for the spring, and suitably adjusted to control the axial force on diaphragm 28. In such an instance the apertures 88 would be omitted.

In operation, upon the admission of pressure fluid such as water or air to the inlet 14, the inlet pressure acts on the end annular surface 55 of the moveable valve member 54 in opposition to the force of spring 84, to provide initial positioning of the valve 54.

The flow of the fluid through the aperture 44 and the related parts of the moveable valve member, causes a pressure drop in the through-flowing fluid, which results in a lower pressure in the outlet chamber. This outlet pressure acts on the inner surface of diaphragm 28, to correspondingly modify the axial position of the valve member 54, thereby further regulating the outlet pressure.

A particular advantage afforded by the present invention, in the provision of a sealing piston or pistons, to limit the effective area of the valve exposed to inlet pressure to the end face, is that a large ratio, as high as in the range of 50 to 1 or even 100 to 1, between the unbalanced valve area and the area of the diaphragm may be achieved, and still maintain a relatively limited diameter for the diaphragm. This effect may be enhanced by appropriate selection of a thin walled moveable valve portion. This in turn extends the range of ratio of inlet pressure to outlet pressure. By selecting a moveable valve arrangement having a right-cylindrical form with other than a circular cross section such as a rectangular hollow section. The peripheral sectional area thereof may be correspondingly increased, and other advantages accrue.

It is contemplated that the piston suspension, which is resilient in order to ensure alignment with the valve member, may be made readily removeable, to facilitate servicing of the piston O-rings.

What I claim as Letters Patent of the United States is:

1. In a fluid pressure regulating valve having a valve body containing an inlet chamber having an inlet, and an outlet chamber having an outlet, first cylindrical valve means located between said chambers having at least one first flow passage therethrough to provide a first fluid flow passage between said inlet and said outlet, second cylindrical valve means coaxial with said first valve means located in said inlet chamber having a second flow passage therethrough, said second valve means being relatively moveable axially in flow varying relation with said first valve means and force responsive means biassing one said valve means axially relative to the other said valve means in flow controlling relation, the improvement comprising fixed piston means within said second valve means having an annular seal in sealing relation between said valve means and said piston, said second valve means having an annular end face located adjacent said inlet in direct axial facing relation therewith providing an axially unbalanced area, said end face area being exposed in operation to inflowing fluid in force generating relation thereagainst, to initiate change in the relative axial positions of said first and second valve means in flow modifying relation in response to the flow of said fluid through said inlet, whereby the pressure of fluid at said outlet is correspondingly modified.

2. The regulating valve as claimed in claim 1 wherein said force responsive means includes a diaphragm mounted in pressure sensing relation relative to said outlet chamber, and force applying means contacting said diaphragm in opposing relation thereto, whereby the total forces acting on the moveable portion of said valve means comprises said force applying means opposing said diaphragm means, with said unbalanced area also acting in supplementing relation to said diaphragm means.

3. The valve as claimed in claim 2 wherein said force applying means comprises adjustable spring means.

4. The valve as claimed in claim 2 wherein said force applying means comprises cylindrical valve means corresponding to said second cylindrical valve means and secured in coaxial relation therewith, having said diaphragm in interposed force transmitting relation therebetween.

5. The valve as claimed in claim 4 having a pair of said inlets to receive pressure fluid at two respective line conditions, including a pair of said outlet chambers having said diaphragm in separating relation therebetween.

6. A pressure equalising valve having a pair of inlet chambers, each having an inlet to receive in operation a respective pressurized fluid supply in connected relation therewith, a pair of outlet chambers, and valve means interposed in flow regulating relation between each said inlet chamber and the respective outlet chamber for maintaining in predetermined relation the output pressure of two fluids supplied thereto, said valve means having a balancing valve mechanism comprising a slide valve means mounted in each said inlet chamber and supported in axially positioned pressure controlling relation by a diaphragm arranged in chamber dividing relation with said pair of outlet chambers, and substantially immoveable piston means within each said slide valve means blocking a cross section portion of each said slide valve means from exposure to the respective fluid inlet pressure, to provide a predetermined area of said valve means in pressure responsive axially unbalanced relation within the respective said inlet in direct axially facing relation with the respective said inlet chamber to assist in positioning said valve members in flow regulating relation.

7. The valve as claimed in claim 6, said piston means enclosing inner sealed spaces within said slide valve members, said spaces being in connected relation to maintain a constant volume despite variations in axial location relative to said balancing valve mechanism due to movement of said diaphragm.

* * * * *